Sept. 27, 1938.    T. B. TYLER    2,131,201
COMPOSITE CLUTCH
Filed Aug. 4, 1928    2 Sheets-Sheet 2
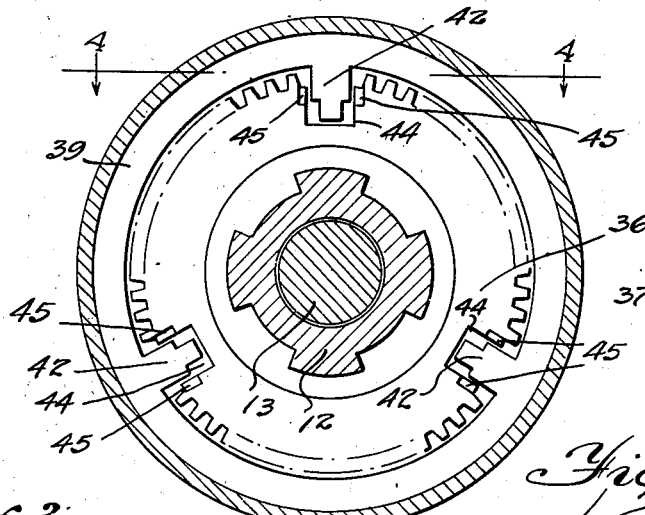
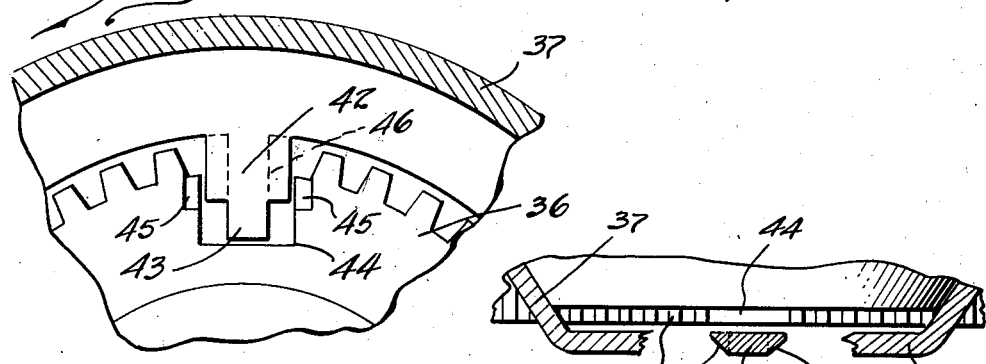
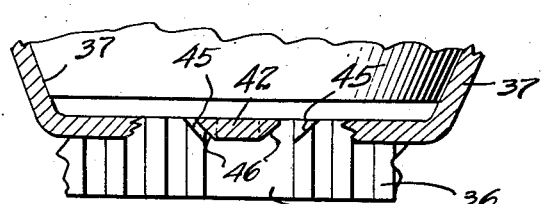
INVENTOR.
Tracy B. Tyler
BY
Swan, Frye, & Murray
ATTORNEYS Patented Sept. 27, 1938

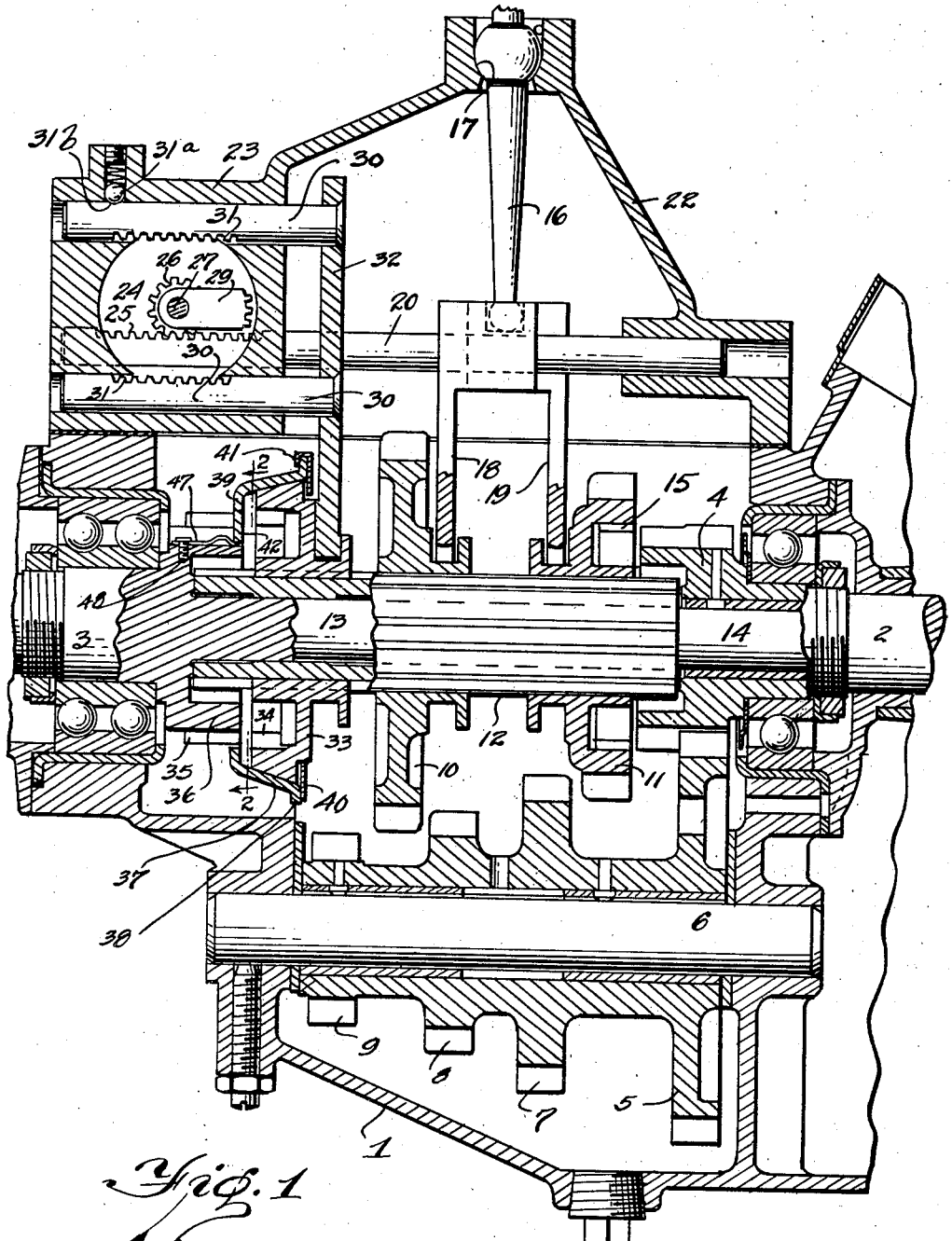

2,131,201

UNITED STATES PATENT OFFICE 2,131,201

COMPOSITE CLUTCH

Tracy B. Tyler, Detroit, Mich., assignor, by mesne assignments, to General Motors Corporation, Detroit, Mich., a corporation of Delaware Application August 4, 1928, Serial No. 297,523

11 Claims. (Cl. 192—53)

This invention relates to composite frictional and positive clutches in which the friction clutch serves to synchronize the speeds of the positive clutch elements before an attempt is made to intermesh the latter.

An object of the invention is to enable two axially alined power transmitting members, respectively equipped with toothed positive clutch elements, to be positively coupled without clash by first bringing said members to equal speeds by means of a friction clutch or coupling designed to prevent interengagement of the positive clutch elements as long as the power transmission members are rotating at unequal speeds, but to permit interengagement of said positive clutch elements in response to force applied thereto in an axial direction when equal speeds of the power transmitting members have been brought about by the engagement of the friction clutch members.

This object is attained thru means comprising a pair of friction clutch members and a pair of positive clutch elements which when forced toward intermeshing relation cause the engagement of the friction clutch members, one of said friction clutch members having a detent set in the path of a cooperative detent on one of the power transmitting members in response to a differential or asynchronous rotation of the power transmitting members, said detents being susceptible of being displaced angularly to permit engagement of the positive clutch elements in response to an axial force applied to one of the latter.

In the accompanying drawings which illustrate one embodiment of the invention,

Fig. 1 is a view of the transmission in longitudinal vertical section, showing the neutral position of the parts.

Fig. 2 is a vertical section taken upon the line 2—2 of Fig. 1 showing a provision for preventing clashing of the teeth of a clutch establishing a drive from the transmission.

Fig. 3 is an enlarged view of a portion of Fig. 2.

Fig. 4 is a plan view of said anti-clash mechanism, partly in section on the line 4—4 of Fig. 2.

Fig. 5 is a view similar to Fig. 4, but showing the clutch members fully engaged.

The illustrated embodiment contemplates application of the composite coupling shown, to a transmission rear-end coupling adapted to release the change-speed gears from the propeller shaft of a motor vehicle prior to changing the gear ratio, but it will be obvious that the mechanism of the composite coupling shown may be applied to any two coaxial power members intended to be coupled and uncoupled.

In said views, the reference character 1 designates a transmission casing, having journaled in its respective end walls the usual aligned drive shaft 2 and driven shaft 3. As is common practice, said drive shaft rigidly carries within the casing 1 a gear 4, permanently meshing with a gear 5 rotatable upon a countershaft 6. Also rotatable upon said countershaft are the usual gears 7, 8 and 9 which, as shown, are rigidly connected to each other and to the gear 5. With said gears coacts a pair of gears 10 and 11 slidable coaxially with respect to the shafts 2 and 3.

Departing from common practice, the gears 10 and 11 are splined upon a sleeve 12, or otherwise adapted to slide upon said sleeve, while rotating therewith. The sleeve 12 is free to turn upon a reduced extension 13 of the shaft 3, which is terminally journaled, as indicated at 14 in the shaft 2. A portion of the gear 4 functions as a clutch element for engagement by internal clutch teeth 15 on the gear 11.

It will be evident to those familiar with the art that the gears 10 and 11, in their different positions, permit a selection of desired speeds.

For controlling the gears 10 and 11 there is provided the usual shift lever 16, universally pivoted at 17 in the casing cover, the lower portion of said lever being adapted, as is common practice, to alternatively actuate a pair of yoke members 18 and 19, respectively engaging the gears 10 and 11 and carried by a pair of horizontally spaced gear shifting slide rods one of which is shown at 20.

The cover member 22 of the casing 1 has integrally and exteriorly formed upon its rear end a housing 23, mounting the rear portions of said slide rods. Said housing is chambered from side to side thereof, as indicated at 24, and portions of the slide rods extending through said chamber are formed upon their upper faces with similar racks 25. With said racks are meshed a pair of pinions 26 mounted to rotate freely and independently on a shaft 27 which extends centrally through the chamber 24 and has its ends secured in caps closing said chamber. Integrated with each pinion 26 (or otherwise rigidly connected thereto) is a gear segment 29, said segments adjoining each other and having an equal radius, exceeding that of said pinions.

In the upper and lower portions of the housing 23, a pair of rods 30 are mounted to slide in unison parallelly to said gear shifting slide rods, said rods 30 being positioned with their axes in the vertical plane established by the adjoining faces of the segments 29. Upon the lower face of the upper rod 30 and the upper face of the lower of said rods, toothed racks 31 are formed. In the neutral position of the transmission gears, the segments 29 project similarly forwardly, as shown in Fig. 1, and by its rotation through an acute angle either of said segments may be meshed with either of the racks 31. A spring-pressed ball detent 31ª is engageable in a depression 31ᵇ of one of the slide rods 30 to normally maintain their position shown in Fig. 1.

The rods 30 have their rear end portions correspondingly projecting into the casing cover 22 and within said cover, a yoke member 32 is riveted or otherwise rigidly secured to said rods. The lower portion of said yoke member, projecting into the casing, proper, operatively engages a sliding clutch member 33, splined upon the sleeve 12, and formed with female clutch teeth 34. By actuation of the clutch member 33 to the left from its position shown in Fig. 1, the clutch teeth 34 are engageable with the teeth 35 of a male clutch member 36 integral with, or otherwise secured upon the driven shaft 3. Shaft 3 and sleeve 12 therefore constitute two power transmitting members of an automobile transmission which may be coupled or uncoupled.

The clutch member 33 has its peripheral face coned rearwardly of the transmission, for frictional engagement with a conical ring 37 formed with external and internal annular flanges 38 and 39 respectively at its forward and rear ends. To the flange 38 is secured a ring 40 constituting a limiting stop which extends inward sufficiently in front of the member 33 to permit an axial movement of the ring 37 only sufficient to frictionally engage said ring with and disengage it from the coned periphery of the member 33. As illustrated, the attachment of the ring 40 to the ring 37 is effected by forming the former with tongues 41 which are bent to embrace the flange 38 of the latter. Ring 37 with its internal conical friction surface and that portion of member 33 having the external conical friction surface constitute a pair of friction clutch members adapted to produce equal speeds of the two co-axial power transmitting members prior to intermeshing the toothed clutch elements thereof.

The flange 39 is formed with a plurality of inwardly projecting arms or lugs 42, preferably equidistant, the inner end portions 43 of which are reduced in width, as best appears in Figs 2 and 3. In the illustrated embodiment of the invention, three such lugs are shown. The clutch member 36 which is shown as integral with shaft 3 has formed in its toothed face a plurality of grooves 44 extending between the front and rear faces of said clutch member and preferably having a depth exceeding that of the teeth 35 and a width slightly greater than that of the lugs 42. The grooves 44 correspond in number and in their spaced relation to the lugs 42 and form passages through which said lugs may travel when the member 33, together with the ring 37 is being advanced or retracted to intermesh the clutch teeth 34 and 35, or disengage the same.

As best appears in Figs. 2, 3, and 4 the upper portions of the walls of the grooves 44 are beveled at their intersections with the forward face of the member 36, as indicated at 45, so as to form a flaring inlet to said grooves, and corresponding bevels 46 are formed upon the lateral edges of the lugs 42 (but not upon their reduced extremities 43). The beveled surfaces 45 and 46 constitute detents or checks for a purpose to be presently made clear. When the clutch element 33 and the ring 37 carried by said clutch element are at the forward limit of their sliding travel, the lugs 42 are in the flared entrance portions of the grooves 44, while the reduced ends 43 of said lugs extend inwardly, beyond said entrance portions. Thus it is evident that said lugs compel the ring 37 to rotate always in unison with the clutch member 36, since said lugs, in all positions of said ring, are engaged in the grooves 44 of said clutch member. The purpose of the reduced ends 43 of said lugs is to transmit the drive from said clutch member to the ring (or vice versa) without subjecting the ring to the forward thrust which would result if engagement of the beveled faces 45 and 46 occurred in the disengagement position of the friction member.

Secured to the clutch member 36, in each of its grooves 44 is a leaf spring 47, secured by a rivet 48 or the like to the bottom of such groove and bowed slightly upward adjacent to the entrance portion of the groove. The bowed portions of said springs are so located as to offer a slight resistance to the initial rearward actuation of the ring 37 so as to compel a definite frictional engagement of said ring with the coned periphery of the member 33 immediately on rearward actuation of said member.

In the operation of the described transmission, when the lever 16 is manipulated from its neutral position shown in Fig. 1 to establish any of the possible selective drives, one or the other of the slide rods 20 and its companion is necessarily slid either forward or back. Since each of said rods is formed with a rack 25 engaging a pinion 26, one of said pinions will necessarily be partially rotated, rotating also the segmental gear 29 which is integral with said pinion. While such segmental gear is traveling from its normal horizontal position into engagement with one or the other of the racks 31, the yoke member 18 or 19 which is being actuated at the same time, will shift one or the other of the slide gears 10 and 11 so as to slightly engage the teeth thereof with those of one of the non-sliding gears. This will involve no clashing of the gears since the transmission at this time is declutched from the engine by the usual clutch (not shown) and is also declutched from the driven shaft, since the clutch teeth 34 and 35 are disengaged.

As soon as either segment 29 is meshed with one of the racks 31, said rack, together with the yoke 32, and the clutch member 33 engaged by said yoke is actuated rearwardly. It is an important feature of the construction that regardless of which gear shifting slide rod is slidingly actuated from its neutral position, regardless of the direction of its actuation, there is always effected a rearward actuation of the clutch member 33. This follows from the fact that one of the segments 29 is necessarily swung either upwardly and rearwardly or downwardly and rearwardly, responsive to any travel of either slide rod, from its neutral position, and consequently the rack rods 30 eventually engaged by such segment must necessarily be shifted rearwardly together with the companion rack rod, yoke member 32, and clutch member 33.

Coaction of the coned ring 37 with the coned peripheral face of the clutch member 33 and also with the grooves 44 of the clutch member 36, prevents any clashing of the clutch teeth 34 and 35 by holding said clutch teeth out of engagement until the speeds of their rotation (if either or both are rotating) are equalized. Thus, if there is any appreciable difference in the speeds of the two clutch members 33 and 36, when the former is rearwardly actuated, the coned ring 37 will tend to lag so far as permitted by the engagement of the lug extremities 43 in the entrance portions of the grooves 44 with the result that one or the other of the beveled faces 46 of the lugs will engage the corresponding bevels 45 at the groove entrances and will resist sliding travel of the ring 37. The tendency of the ring 37 to lag behind the position of full registration of its lugs 42 with the grooves 44 arises to some extent from the inertia of said ring but primarily from the fact that said ring, even in the neutral position of the parts, has a slight frictional engagement with the coned periphery of the member 33. The amount of such friction and the resulting tendency to lagging of the ring 37 is, of course, immediately greatly increased when a rearward actuating force is applied to the member 33. The continued application of a rearward actuating force to the member 33 will act through the coned face of said member upon the ring 37, to retard whichever of said members has the higher velocity of rotation and to accelerate the one which is turning more slowly, so that a rapid equalization of speeds will be accomplished. When such equalization has sufficiently progressed that the rearward force applied to the sliding member 33 is able to overcome the circumferential pressure with which the beveled faces 46 and 45 engage each other, the lugs 42 will advance rearwardly through the grooves 44 to the positions in which they are shown in Fig. 5 and the clutch teeth 34 and 35 will then engage without clashing. The same final movement of the lever 16 which engages the clutch teeth 34 and 35 completes the inter-engagement of either gear 10 or 11 with the gear 4, 7, 8 or 9, with which it was partially engaged through the initial actuation of said lever.

It is evident that the angles of the bevels 45 and 46 are an important factor in determining the conditions under which the clutch teeth 34 and 35 will be permitted to engage. That is to say, the resistance to entrance of the lugs 42 into the grooves 44 will be increased or decreased according as the magnitude of the angle formed by said bevels with the axis of the clutch is increased or diminished. In actual practice, these angles will depend upon the size of the transmission, varying approximately from 60° to 30° according to whether the rotating parts of the transmission are small and productive of a comparatively low inertia factor or large and productive of a high inertia.

In reestablishing the neutral position of the transmission gears, one of the gear shifting slide rods will act through the engaged pinion 26 and connected segment 29 to forwardly actuate one of the rods 30 and the yoke member 32 carried thereby, disengaging the clutch teeth 34 and 35. At the same time, one of the yoke members 18 and 19 will withdraw from its driving position, that one of the gears 10 and 11, which was previously establishing the drive.

It is a feature of the described anti-clash mechanism that it opposes immediate engagement of the clutch members 33 and 36 only when there is such a differential in the rotative velocities of such clutch members as would be productive of clashing. When said clutch members are stationary or are turning at substantially equalized speeds, the circumferential force with which the beveled faces 45 and 46 engage each other will not be superior to the rearward force manually applied to the member 33 and the lugs 42 will travel freely into the grooves 44, since the axial force applied to shift clutch member 33 is resolved by the beveled faces 45 and 46 into two forces one of which acts tangentially to the arc of rotation of said beveled faces thus tending relatively to displace angularly the two power transmission members and allow the clutch teeth to intermesh. When the speeds of the two power transmitting members are equal the tangential force necessary to produce this displacement is slight because it need only be sufficient to rotate the sleeve 12 and the gears on it.

While the invention has been illustrated as applied to a sliding gear type of transmission, it will be readily understood that the improved features are equally applicable to various other transmissions, such as those in which the gears are in permanent mesh, and the selection of speeds is effected by means of sliding clutch elements.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In a transmission mechanism, the combination with a pair of axially alined rotative, positive drive elements one of which is slidable to engage the other, of means for preventing clashing of said elements, comprising a member rigidly carried by the sliding element said member having a coned friction face, and a coacting coned friction member loosely mounted on and connected to said sliding element to slide therewith, said coacting coned friction member having a lost motion driving connection with the other positive drive element arranged to permit relative axial movement between them, and cooperating inclined detents on said last named member and element.

2. In a transmission mechanism, the combination of two axially alined power transmitting members capable of relative rotation each carrying a positive clutch element engageable with and disengageable from the other, one only of said positive clutch elements having external grooves extending substantially parallel with the axis; companion friction clutch members one of which is rigidly secured to the non-grooved positive clutch element and the other of which is loosely mounted on the latter in position to engage its companion, and is equipped with projections narrower than and movable in said grooves, said projections and the side walls of said grooves having cooperating inclined detent surfaces adapted to restrain intermeshing of the positive clutch elements until the speeds of the latter are substantially equal.

3. In a transmission mechanism, in combination with a pair of axially alined rotative positive clutch elements capable of slidable engagement and disengagement one with the other, means for preventing the clashing thereof comprising a pair of frictionally coacting members longitudinally movable with one of said clutch elements, said other clutch element having a groove, a lug on one of said frictionally coacting members engaging in said groove, and a spring cooperating with said lug and groove serving to resist relative longitudinal movement.

4. In a transmission mechanism, in combination with a pair of axially alined rotative positive drive elements capable of slidable engagement and disengagement, one of said elements having a groove elongated parallel to their common axis, a pair of frictionally coacting members, one of which is fast upon the other element, and the other of which is loose upon said other element and is adapted for limited axial movement to effect the engagement or disengagement of the companion friction member, said member that is loose upon the other element having a lug engaging said groove and means for applying an initial resistance to the axially lengthwise movement of said loose member, thereby establishing frictional engagement between said friction members.

5. The combination of two co-axial power transmitting members, respectively including an axially fixed and an axially movable positive clutch element adapted to be coupled or uncoupled, the axially movable element having a friction surface fixedly associated therewith constituting one member of a frictionally engageable pair adapted when engaged to bring said power transmitting members to equal speeds; a frictionally engageable member connected by lugs and grooves to the power transmitting member having the axially fixed positive clutch element in such manner as to be capable of limited angular movement thereon, said last named frictionally engageable member being loosely supported on said movable positive clutch element so as to have a slight relative axial movement with respect thereto, and inclined detent elements on said last named friction member and power transmitting member adapted to be alined in response to a differential rotation of said power transmitting members.

6. A combination as defined in claim 5 in which the frictionally engaging members are respectively externally and internally surfaced members of a conical pair, the internally surfaced member having a stop arranged to engage said movable positive clutch element to permit limited axial movement relative thereto sufficient to allow release of frictional driving engagement between the frictional surfaces.

7. The combination of two axially alined power transmitting members, each comprising a positive clutch element, one of which is axially fixed and the other axially movable into and out of engagement with the other; an externally surfaced conical frictionally engageable member fixedly associated with the axially movable positive clutch element; a cooperating internally surfaced conical clutch member having its friction surface loosely bearing on the friction surface of the externally surfaced conical member, a stop adapted to permit limited axial movement of said internally surfaced frictionally engageable member with respect to the externally surfaced member; cooperating grooves and lugs on said power transmitting member comprising the axially fixed positive clutch element and on said internally surfaced friction member, the grooves being wider than the lugs engaging therein; and inclined cooperative detent elements on said last named friction member and power transmitting member, said detent elements arranged to be alined when the friction member is at one limit of its limited angular movement with respect to the power transmiting member.

8. In a transmission mechanism, the combination with positive clutch elements one of which is slidable to engage the other; of a cone surfaced friction clutch member slidable and rotatable with the slidable positive clutch element; a coacting coned friction clutch member loosely supported on said slidable element and having a lost motion rotative driving connection with the other positive clutch element; cooperating inclined detents on said last named friction clutch member and said other positive clutch element, and means to allow said last named element to advance when the inclined detents are disalined.

9. In transmission mechanism, the combination with a pair of positive clutch elements, one of which is slidable to engage and disengage the other, and one only of which is provided with axially directed grooves having spaced opposed obliquely disposed detent faces; of a friction clutch member rotatively driven with the non-grooved element; a companion friction clutch element loosely supported on the non-grooved element and having projections slidable in the grooves of the grooved element, said projections being of a width less than that of the spaces between the detent faces in the grooves, and having coacting detent faces adapted to be alined with said detent faces in the grooves in response to asynchronous rotation of the positive clutch elements.

10. In transmission mechanism, the combination of two coaxial power transmitting members respectively including an axially fixed and an axially movable positive clutch element, the axially fixed positive clutch element having axially directed grooves provided with spaced opposed oblique detent surfaces; a friction clutch member rotatable and axially movable with the slidable positive clutch element; a companion friction clutch member provided with lugs movable in the grooves of the grooved positive clutch element, said lugs being of less width than the spaces between the oblique detent surfaces in the grooves; said companion friction clutch member being loosely supported on said axially movable positive clutch element so as to be capable of slight axial movement relative to the other friction clutch member.

11. The combination of two axially alined power transmitting members each having rotary driving connection with one of a pair of intermeshable positive clutch elements and also with one of a pair of engageable and disengageable friction clutch members, one of said friction clutch members being mounted to have a limited rotary and axial movement with respect to the power transmitting member with which it has a driving connection; the positive clutch element driven by said last-named member having groups of teeth spaced apart angularly, and said last-named friction clutch member having openings to permit the passage of said groups of teeth and radial arms registering with the tooth separating spaces of said positive clutch element, and cooperating detents on the side walls of said spaces and on the edges of said radial arms, said spaces being somewhat wider than the arms that register therewith.

TRACY B. TYLER.